Patented June 8, 1954

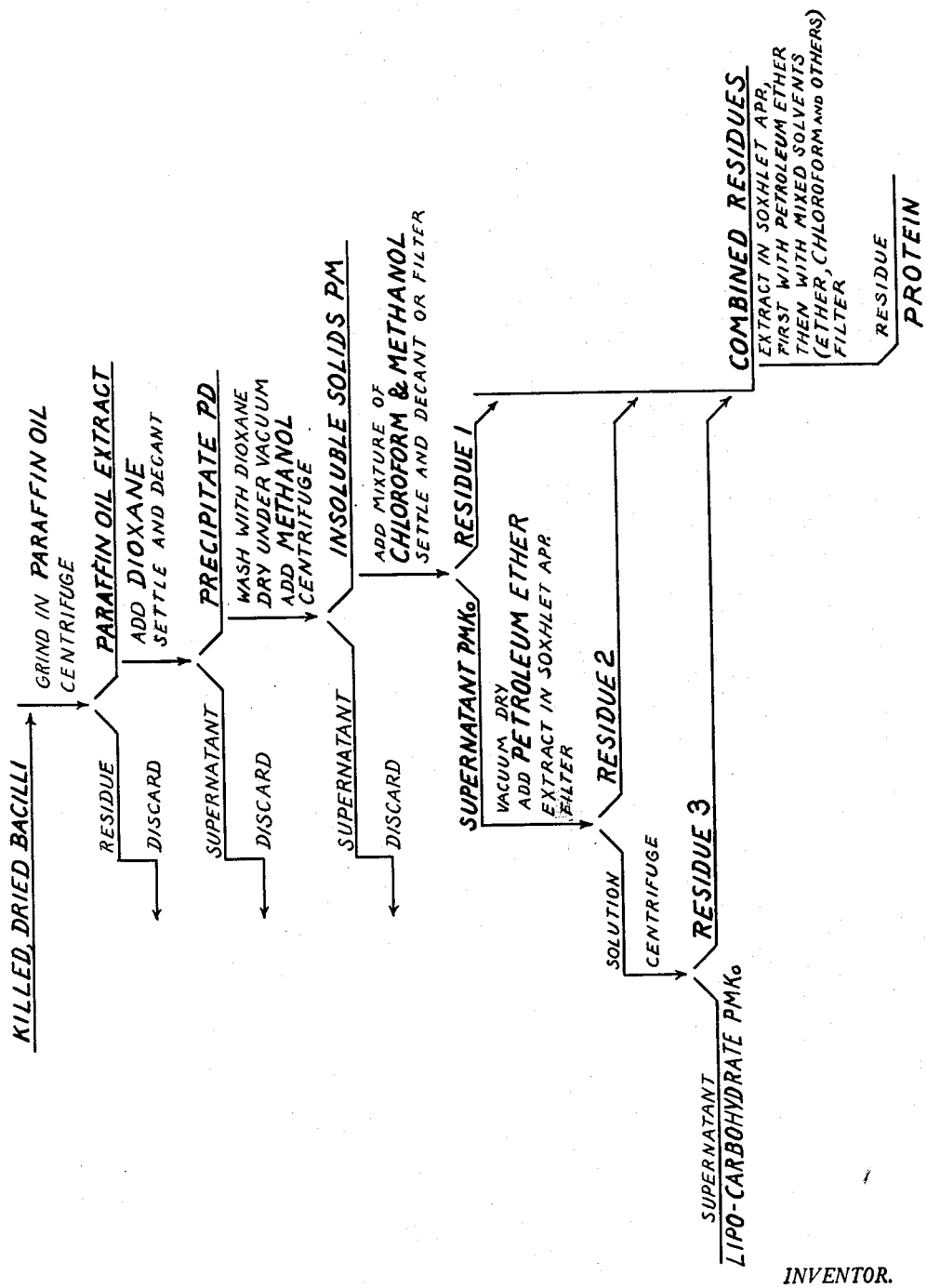

2,680,702

UNITED STATES PATENT OFFICE 2,680,702

ANTIGEN FROM DEAD TUBERCLE BACILLI AND ITS EXTRACTION

Nine Choucroun, Paris, France, assignor to Centre National de la Recherche Scientifique, Paris, France, a corporation of France Application July 11, 1952, Serial No. 298,315

7 Claims. (Cl. 167—84.5)

This invention relates to antigens from tubercle bacilli and more particularly to two antigenic components extracted from dead tubercle bacilli, both singly and in reconstituted combination, and relates as well to processes of isolating those components.

It is well known that dead, as well as living tubercle bacilli have the power of inducing true tuberculin type hypersensitivity and acquired resistance in experimental animals and that the bacterial cell, as cultivated in vitro contains, among its constituents, viz: proteins, lipids and carbohydrates, the antigens responsible for these two specific effects.

When experimental animals have been injected with dead tubercle bacilli, they develop a certain degree of acquired resistance, but they also develop, at the same time, a state of hypersensitivity revealed by the skin tuberculin test.

The present invention relates to a lipo-carbohydrate component of dead tubercle bacilli.

An object is to separate from dead tubercle bacilli an intermediate product which can be marketed as such for conversion by others or hydrolyzed immediately thereafter to provide a reagent for the diagnosis and for the prognosis of tuberculosis in animals and humans by a direct precipitin test using a serum removed from tuberculous animals and humans respectively.

Another object is to provide an animal immunizing serum from animals injected with a paraffin-oil extract of dead tubercle bacilli.

Still another object is to provide a product which, when injected into animals and humans along with a protein component extractable from dead tubercle bacilli, induces allergy towards tuberculin.

The process by which the products of the present invention are obtained involves initially, and fundamentally, the extraction of dead tubercle bacilli with paraffin oil.

This novel step is suitably accomplished by grinding the bacilli in warmed mineral oil and then centrifuging and collecting the supernatant liquid, the oil extract, which contains the antigenic components. This oil extract has the capacity, when injected intraperitoneally into normal animals, to induce carbohydrate antibody-formation.

Then dioxane is added to the paraffin oil extract thereby forming a precipitate. After being washed with methanol, this precipitate is treated with chloroform having its solubilizing capacity enhanced by an addition of a small amount of methanol, to extract the chloroform soluble component or components. The supernatant liquid is then separated from the residue and the solvent is evaporated from the former, leaving a dried mass. This mass is next treated with petroleum ether and the ether soluble portion is then separated from the insoluble residue. The solution obtained is then centrifuged thereby providing a supernatant liquid and a third residue.

This last mentioned liquid, obtained by extracting with organic solvents only, constitutes the most purified fraction contemplated by the present invention containing the immunizing component or components of the initial dead tubercle bacilli. The three residues mentioned may be further relieved of immunizing compounds by again extracting with petroleum ether and other solvents.

The ultimate supernatant liquid produced as above described has been found, through analysis, to comprise a lipo- carbohydrate and to be composed essentially of a polysaccharide ester of mycolic acid. It is very soluble in chloroform, ether, petroleum ether, and benzene and is insoluble in ethanol, methanol, dioxane and water. It has a melting point from 220° to 240° C. and has proved to be partly acid fast.

The elementary composition of a typical sample is carbon 53.84%, hydrogen 10.11%, nitrogen 1.05% and phosphorus 0.41%. Analysis has shown that the nitrogen content is not due to the presence of protein.

This lipo-carbohydrate has the property of inducing antibody-formation when injected alone into normal animals. It is the first time that a lipo-carbohydrate soluble in chloroform, extracted from dead tubercle bacilli, has been found to induce antibody-formation. The so formed antibodies appear to be related to immunity.

This lipo-carbohydrate, when hydrolyzed, leads to a serologically active hydrolysate which can be employed successfully to detect the presence of antibodies in sera removed from the bodies of tuberculous humans and animals.

The combined residue fraction obtained in the above-described process is of the nature of proteins and is very insoluble in the usual organic solvents such as alcohol, methanol, chloroform, petroleum ether and benzene. A typical chemical analysis of the product, which has no melting point, is carbon 50.13%, hydrogen 7.75%, nitrogen 6.58% and phosphorus 0.46%.

This protein fraction has by itself, neither immunizing nor sensitizing properties. However, when the lipo-carbohydrate fraction produced as above described is added to said protein fraction, the resulting mixture is capable of establishing the true tuberculin type of hypersensitivity when injected in paraffin oil into normal animals and humans.

The intraperitoneal injection of 0.2 mg. (repeated once) of a mixture consisting of 50% lipo-carbohydrate and 50% protein into guinea pigs makes them highly sensitive to the intracutaneous injection of old tuberculin as well as to whole intact bacilli. The same type of tuberculous allergy can be induced in humans by a single subcutaneous injection of 500 gamma of the same mixture.

A typical process illustrative of the present invention is described below, said process being illustrated by the annexed flow sheet.

(1) Preparation of paraffin oil extract

Killed, dried bacilli in the quantity of X grs. in admixture with paraffin oil in a quantity of 3X cc. was ground in a mortar at a temperature of about 40° C. for two hours. Thereupon the mixture was centrifuged for about one hour at 3,500 R. P. M. The residue separated from the supernatant was again extracted with paraffin oil in the quantity of 2X cc., the mixture being again centrifuged to provide a second supernatant, and a residue which was discarded. This second supernatant was then mixed with the first supernatant and the two were centrifuged for an hour at 13,500 R. P. M., the supernatant separated and the residue discarded. This last mentioned supernatant was then centrifuged again for four hours at the same rate of 13,500 R. P. M. The supernatant collected from this operation after filtration constitutes the oil extract employed in the subsequent extraction step.

(2) Precipitation with dioxane

Five hundred ml. flasks were set up with well fitted corks, and in each flask were measured 50 ml. of the filtered oil extract. One hundred and twenty-five cc. of dioxane were added to each 50 cc. of oil, gradually with shaking. After sufficient time (10 to 15 minutes) to allow precipitation to take place, 250 ml. more dioxane were added to each flask, all at once. The flasks were left overnight and the next day the supernatant was carefully decanted. The precipitate was then centrifuged in 90 ml. tubes, and the total finally collected in 4 tubes. It was then washed 4 successive times with clean dioxane to get rid of the oil. Each time, to the precipitate collected in the centrifuge tube was added clean dioxane little by little with stirring. After all the oil was removed, the precipitate PD was dried under vacuum.

(3) Extraction with methanol

The dried precipitate PD was then extracted with methanol. To this precipitate, 250 cc. of methanol was added. The insoluble part was collected by centrifugation, and washed with methanol until the solvent did not dissolve anything more from the precipitate.

(4) Extraction with chloroform

The resulting insoluble part PM was then extracted with a solution of chloroform containing 5 per cent methanol. To the precipitate PM were added 300 cc. of this chloroform-methanol solution. Most of the PM seemed to be dissolved. It was then either put in a separatory funnel or filtered through a Soxhlet thimble. The clear fluid, chloroform extract (first supernatant PMKo), was evaporated under vacuum in a round bottom flask until dry. The insoluble residue 1 was saved.

(5) Extraction with petroleum ether

This dried extract was then extracted in a Soxhlet apparatus with petroleum ether. Some insoluble substance remained in the thimble (residue 2). The soluble part was centrifuged for 30 minutes in a Sorval angle centrifuge. The supernatant contains the final lipo-carbohydrate complex.

The insoluble part or residue 3 was added to the previous residues 1 and 2, and the total residue was crushed and repeatedly extracted in the Soxhlet apparatus with petroleum ether and also with a mixture of solvents containing: petroleum ether (2), ether (1.5), chloroform (1), ethanol (½), and methanol (1).

The residue taken from the Soxhlet thimble, was washed once more with petroleum ether and collected by centrifugation. This final residue is the protein fraction of the dead bacilli.

The lipo-carbohydrate fraction usually amounted to 50 percent of the amount of the dioxane precipitate PD while that of the protein fraction was only $\frac{1}{30}$ of the amount of PD.

Guinea pigs injected intraperitoneally with the lipo-carbohydrate fraction in paraffin oil alone or with such material in combination with the protein material showed resistance to tuberculous infection. More than five hundred animals used in several successive experiments extending over a period of five years showed a definite degree of acquired resistance when infected, several months after immunization with the lipo-carbohydrate PMKo as above obtained. This definite acquired resistance was observed in spite of the high virulence of the strains employed for infection, in spite of the severe intraperitoneal route of infection and in spite of the well known high susceptibility of guinea-pigs to tuberculous infection.

Though devoided of immunizing properties when used alone, the protein fraction showed the power of enhancing the antigenicity of the lipo-carbohydrate fraction.

The intraperitoneal injection of the paraffin oil extract alone into normal animals induces the formation of antibodies. Therefore, the serum of the thus injected animals could be used for injection into other normal animals to induce antibody formation.

As above mentioned, the hydrolysate of the lipo-carbohydrate fraction may be used to detect the presence of carbohydrate antibodies in tuberculous animals and also in human beings suffering from tuberculosis, by a direct precipitin test, which is the first precipitin test available in tuberculosis.

This serological reaction has a high degree of specificity since no cross reaction has been found with sera of nontuberculous human beings, whether normal or suffering from other diseases: a positive precipitin reaction with a given human serum is a definite indication of tuberculosis activity, present or having been recently present for the near past. Five hundred mg. of the lipo-carbohydrate were dissolved in 5 cc. of benzene, and 20 cc. of the methanol potassium hydroxide solution were added to it. The hydrolysis proceeded for twelve hours at a temperature of 100° C. At the end, all the material was extracted with ether in a separatory funnel. The water soluble part was washed many times with ether. Said water soluble part was used as antigen to detect carbohydrate antibodies in the sera removed from tuberculous patients.

To perform the test, venous blood from the patient was collected in a vacuum tube, allowed to clot at room temperature, then stored at 4° C. overnight. Serum was removed after centrifugation at 2,000 R. P. M. for fifteen minutes, then recentrifuged at 4,500 R. P. M. for five minutes. Two cc. of serum were put in each of two sterile Wassermann tubes. To one of these tubes 5 gamma. of the antigen obtained as previously described was added, the other tube was kept as a control. The tested serum as well as the control serum were stored at 4° C. for eight days, then centrifuged for five minutes at 4,500 R. P. M.

In the serum tube to which the antigen had been added, a firm transparent disc was formed, which could be easily seen by slight agitation of the tube. In the control serum tube, to which only saline solution was added, no such precipitate was observed.

More than a thousand patients have been submitted to the above described test. It was found that the positivity of said test is a definite indication of tuberculosis activity in the body of the patient. In more than fifty cases in which the conventional investigation methods failed to lead to a definite diagnosis, the results given by the above test enabled the physician to precise the diagnosis and further investigations led to the finding that there was, or was not, according to the positive, or negative, result of the test, a tuberculous activity.

Definite utility for the process and products of the invention has been established in providing the hereinbefore mentioned lipo-carbohydrate intermediate, the hydrolysate of which has proven valuable in the diagnosis of tuberculosis in patients before they reveal such disease by the ordinary tests.

The operability of this lipo-carbohydrate in imparting immunity to guinea pigs has also been unequivocally established.

It should be understood that the invention is not limited to the specific details herein given but that it extends to all equivalents which will occur to those skilled in the art upon consideration of the scope of the claims appended hereto.

This application is a continuation in part of Serial Nos. 723,611 and 723,612, both filed January 22, 1947, and are now abandoned.

What I claim is:

1. In the extraction of antigenic components from dead tubercle bacilli, the steps which comprise forming a paraffin oil extract of said dead bacilli, adding dioxane to said extract thereby forming a precipitate, separating said precipitate from the dioxane solution, washing the precipitate with methanol and extracting soluble components from said precipitate by contacting with chloroform containing a small percentage of methanol.

2. In the extraction of antigenic components from dead tubercle bacilli, the steps which comprise forming a paraffin oil extract of said dead bacilli, adding dioxane to said extract thereby forming a precipitate, separating said precipitate from the dioxane solution, washing said precipitate with methanol, extracting soluble components from said precipitate by contacting with chloroform containing a small percentage of methanol and separating from said components a fraction soluble in petroleum ether by contact with such ether.

3. In the extraction of antigenic components from dead tubercle bacilli, the steps which comprise forming a paraffin oil extract of said dead bacilli, adding dioxane to said extract thereby forming a precipitate, separating said precipitate from the dioxane solution, extracting soluble components from said precipitate by contacting with chloroform containing a small percentage of methanol, separating from said components a fraction soluble in petroleum ether by contact with such ether and centrifuging thereby providing a supernatant liquid containing an antigenic component dissolved therein.

4. In the extraction of antigenic components from dead tubercle bacilli, the steps which comprise forming a paraffin oil extract of said dead bacilli, adding dioxane to said extract thereby forming a precipitate, separating said precipitate from the dioxane solution, separating chloroform soluble and insoluble components from said precipitate by contacting with chloroform containing a small percentage of methanol, separating from said soluble components a fraction soluble in petroleum ether and a fraction insoluble in the latter by contact with each other, centrifuging the said soluble fraction thereby providing a supernatant liquid containing an antigenic lipocarbohydrate dissolved therein, crushing and washing repeatedly all the above mentioned insoluble components and fractions first with petroleum ether then with a mixture of solvents comprising petroleum ether, ether, chloroform, ethanol and methanol, thereby providing as final residue a component of proteinic nature.

5. A serologically active intermediate, the water soluble hydrolysate of which is effective for the diagnosis and the prognosis of tuberculosis by a direct precipitin test applied to serum removed from patients, composed of an intermediate component extracted from dead tubercule bacilli exclusively by organic solvents, having a melting point of 220–240° C., and consisting essentially of a polysaccharide ester of mycolic acid, which is soluble in chloroform, ether and petroleum ether and insoluble in dioxane and alcohols, and having typically an analysis approximating 53.84% carbon, 10.11% hydrogen, 1.05% nitrogen and 0.41% phosphorus.

6. A lipo-carbohydrate component extracted from dead tubercle bacilli exclusively by organic solvents, having the property of inducing allergy towards tuberculin when injected intraperitoneally into guinea pigs along with a protein component extractable from dead tubercle bacilli as a fraction insoluble in alcohols, ether, chloroform, benzene and petroleum ether, said lipocarbohydrate component having a melting point of 220–240° C., and consisting essentially of a polysaccharide ester of mycolic acid, which is soluble in chloroform, ether and petroleum ether and insoluble in dioxane and alcohols, and having typically an analysis approximating 53.84% carbon, 10.11% hydrogen, 1.05% nitrogen and 0.41% phosphorus.

7. A dead tubercle bacilli component, the water-soluble hydrolysate of which is for use in the diagnosis and the prognosis of tuberculosis activity by a direct precipitin test applied to serum removed from the bodies of patients, the said component being composed of an organic solvent extract of dead tubercle bacilli having a melting point of 220–240° C. and consisting essentially of a polysaccharide ester of mycolic acid, soluble in chloroform, ether and petroleum ether and insoluble in dioxane and alcohols, and having typically an analysis approximating 53.84% carbon, 10.11% hydrogen, 1.05% nitrogen and 0.41% phosphorus.

No references cited.